ADDER-SUBTRACTER
Filed Aug. 22, 1960
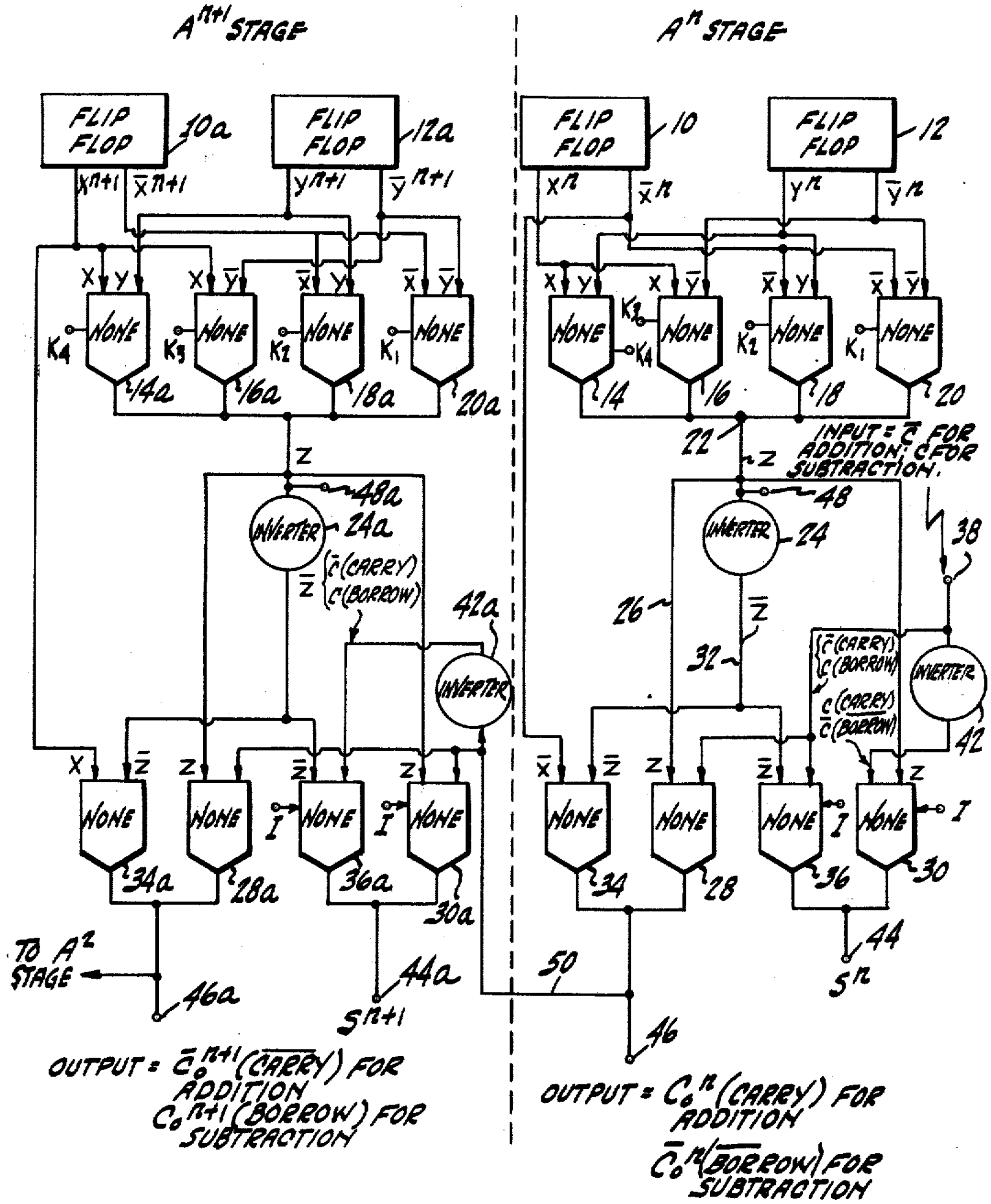
INVENTOR.
WILLIAM J. GESEK, JR.
BY John V. Regan
ATTORNEY

United States Patent Office 3,100,837
Patented Aug. 13, 1963

3,100,837

ADDER-SUBTRACTER

William J. Gesek, Jr., Linden, N.J., assignor to Radio Corporation of America, a corporation of Delaware Filed Aug. 22, 1960, Ser. No. 50,945
9 Claims. (Cl. 235—175)

The present invention relates to a binary adder-subtracter.

A flexible logic network is a computer circuit which is capable of performing one of a number of logic functions. The network may be made up of logic gates to each of which a control voltage and information signals are applied. A control voltage, when at one level, opens the gate to which it is applied and, when at another level, closes the gate. The number of functions the network can perform depends upon the number of variables (information signals) and the number of gates. As one example, if there are four gates, and each gate receives two different input variables, one X or $\overline{X}$ and the other Y or $\overline{Y}$, where X and Y are information signals representing binary digits, then the network can perform the 16 possible logic functions for X, $\overline{X}$, Y and $\overline{Y}$. The control voltages applied to the gates determine the one of the logic functions selected. For example, if the gates are all "and" gates, and the control voltages are such that only the gate receiving X and Y is enabled, then the network performs the logical "and" function XY. If the gates receiving $X\overline{Y}$, $\overline{X}Y$, and XY are enabled, then the network performs the logical "or" function, and so on.

It has been found necessary in one practical computer employing a large number of flexible logic networks such as described above sometimes to add and sometimes to subtract the binary digits applied to the network. The straightforward way of accomplishing either of these arithmetic operations is to apply control voltages to the flexible logic gates which inactivate the gates and to apply the binary digits directly to a binary adder or subtracter.

According to the present invention, use is made of the flexible logic networks to perform part of the addition or part of the subtraction so that the remainder of the addition or subtraction can be performed in much simpler circuits following the flexible logic networks. When operating the circuit of the invention as an adder, control voltages are applied to the flexible logic network to produce an output $XY+\overline{X}\overline{Y}$, and when operating the circuit of the invention as a subtracter, control voltages are applied to the flexible logic network to produce an output $X\overline{Y}+\overline{X}Y$. The circuit following the flexible logic network derives from the quantity $XY+\overline{X}\overline{Y}$, and C, the carry input, the sum S and carry $C_o$ outputs:

$$S(\text{sum})=(\overline{X}\overline{Y}+XY)C+(\overline{X}Y+X\overline{Y})\overline{C}$$

$$\text{and } C_o(\text{carry})=(\overline{X}Y+X\overline{Y})C+XY$$

The same circuit derives from the quantity $\overline{X}Y+X\overline{Y}$ and the borrow C input, the difference S and borrow $C_o$ outputs:

$$S(\text{difference})=\text{same as } S(\text{sum}) \text{ above}$$

$$\text{and } \overline{C}_o(\overline{\text{borrow}})=X\overline{Y}+(XY+\overline{X}\overline{Y})\overline{C}$$

The invention is described in greater detail in the following description and is shown in the accompanying drawing the single FIGURE of which is a block circuit diagram of a portion of an adder-subtracter according to the invention.

The individual blocks shown in the figure are in themselves known circuits. The circuits of the blocks are actuated by electrical signals applied to the blocks. When the signal is at one level, it represents the binary digit "one" and when it is at another level, it represents the binary digit "zero." For the sake of the discussion which follows, the convention is adopted that a high level signal represents the binary digit "one" and the low level signal the binary digit "zero." This assumption holds both for inputs to and outputs from the circuits. Also, to simplify the discussion, rather than speaking of an electrical signal being applied to or derived from a block or a logic network, it is hereafter stated that a "one" or a "zero" is applied to or obtained from the block or network.

The figure includes logic circuits known as multiple input "none" gates. A "none" gate produces a "one" output when all of the inputs to the gate are "zero" and a "zero" output when one or more of the inputs are "one." The gate may consist of an "and" gate with an inverter in series with each input lead to the "and" gate. Alternatively, a "none" gate may consist of an "or" gate followed by an inverter. The Boolean equation for a "none" gate having A and B inputs and a C output is $\overline{A}\overline{B}=C$ or $\overline{A+B}=C$ and the truth table for the gate is:

| A | B | C |
|---|---|---|
| 0 | 0 | 1 |
| 0 | 1 | 0 |
| 1 | 0 | 0 |
| 1 | 1 | 0 |

The circuit shown in FIGURE 1 consists of two stages of a parallel adder-subtracter, however, it is to be understood that the complete adder-subtracter may consist of many more stages. For example, in a practical computer the adder may have 20 or more stages. Alternate stages of the complete adder-subtracter are identical. Thus, the $A^{n+2}$ stage and $A^{n+4}$ stage, neither of which are shown, are identical to the $A^n$ stage, and the $A^{n+3}$ stage and $A^{n+5}$ stage, neither of which are shown, are identical with the $A^{n+1}$ stage. The $A^n$ stage may be the first stage, that is, the one corresponding to digits of the lowest or $A^0$ order.

In the $A^n$ and $A^{n+1}$ stages shown in the drawing, the circuit elements are identical. Accordingly, those of the $A^{n+1}$ stage are legended with the same reference numerals followed by *a*.

Each stage of the circuit includes two flip-flops 10 and 12. The two outputs of flip-flop 10 are $X^n$ and $\overline{X}^n$ and the two outputs of flip-flop 12 are $Y^n$ and $\overline{Y}^n$. The inputs to the flip-flops are not shown but it is to be understood that they are present. A set pulse, indicative of a binary digit to be added (or subtracted), applied to a flip-flop produces a "one" output at the unbarred terminal and a reset pulse applied to the flip-flop produces a "one" output at the barred terminal.

The four outputs of the two flip-flops serve as inputs to four "none" gates 14, 16, 18 and 20. Each "none" gate receives two different inputs, gate 14 receiving XY, gate 16 $X\overline{Y}$, gate 18 $\overline{X}Y$, and gate 20 $\overline{X}\overline{Y}$. These four "none" gates make up a flexible logic network. In other words, the output the network produces depends upon the control voltages $K^1$–$K^4$ applied to the gates. When a control voltage applied to a gate represents the binary digit "one," the gate is inactivated and when it represents the binary digit "zero," the gate is enabled. Since there are four gates and each is capable of assuming two different conditions, the maximum number of different outputs which are possible are $2^4$ or 16. Two of these outputs are employed for the addition function and two are employed for the subtraction function, as is described more fully later.

The output leads from the four gates are connected through a common lead 22 to an inverter 24. Here and in other places in the circuit, a multiple connection to a common point or lead performs the logical "or" function. The input to the inverter is some logical function Z, as is explained more fully below, and the output $\overline{Z}$. Lead 22 is also connected through lead 26 to "none" gates 28 and 30 and the output lead 32 of the inverter is connected to "none" gates 34 and 36.

Another input terminal to stage A is shown at 38. The signal available at this terminal is applied via lead 40 to "none" gates 28 and 36, and through an inverter 42 to "none" gate 30. The second input to "none" gate 34 is the $\overline{X}$ output of flip-flop 10. "None" gates 30 and 36 are connected to a common output terminal 44 and "none" gates 28 and 34 are connected to a common output terminal 46.

The operation of the circuit as an adder or subtracter may be better understood by a consideration of the following truth table for binary addition and subtraction. For addition, $X$=addend, $Y$=augend, and $C$=carry. For subtraction, $X$=minuend, $Y$=subtrahend, and $C$=borrow.

| X | Y | C | Addition | | Subtraction | |
|---|---|---|---|---|---|---|
| | | | $C_o$ (carry) | S (sum) | $C_o$ (borrow) | S (difference) |
| 0 | 0 | 0 | 0 | 0 | 0 | 0 |
| 0 | 0 | 1 | 0 | 1 | 1 | 1 |
| 1 | 0 | 0 | 0 | 1 | 0 | 1 |
| 1 | 0 | 1 | 1 | 0 | 0 | 0 |
| 0 | 1 | 0 | 0 | 1 | 1 | 1 |
| 0 | 1 | 1 | 1 | 0 | 1 | 0 |
| 1 | 1 | 0 | 1 | 0 | 0 | 0 |
| 1 | 1 | 1 | 1 | 1 | 1 | 1 |

From the truth table above, the Boolean expression defining the sum is:

$$S(\text{sum})=\overline{X}\overline{Y}C+\overline{X}Y\overline{C}+X\overline{Y}\overline{C}+XYC \qquad (1)$$

which may be simplified to $$S(\text{sum})=(\overline{X}\overline{Y}+XY)C+(\overline{X}Y+X\overline{Y})\overline{C} \qquad (2)$$

and the Boolean expressions defining the carry and its complement are:

$$C_o(\text{carry})=\overline{X}YC+X\overline{Y}C+XY\overline{C}+XYC \qquad (3)$$

which reduces to $$C_o(\text{carry})=(\overline{X}Y+X\overline{Y})C+XY \qquad (4)$$

$$\overline{C}_o(\overline{\text{carry}})=\overline{X}\overline{Y}\overline{C}+\overline{X}\overline{Y}C+\overline{X}Y\overline{C}+X\overline{Y}\overline{C} \qquad (5)$$

which reduces to $$\overline{C}_o(\overline{\text{carry}})=\overline{X}\overline{Y}+(\overline{X}Y+X\overline{Y})\overline{C} \qquad (6)$$

In like manner, the Boolean equations defining the difference and borrow are:

$$S(\text{difference})=S(\text{sum}) \qquad (7)$$

$$C_o(\text{borrow})=\overline{X}\overline{Y}C+\overline{X}Y\overline{C}+\overline{X}YC+XYC \qquad (8)$$

which reduces to $$C_o(\text{borrow})=\overline{X}Y+C(XY+\overline{X}\overline{Y}) \qquad (9)$$

$$\overline{C}_o(\overline{\text{borrow}})=\overline{X}\overline{Y}\overline{C}+X\overline{Y}\overline{C}+X\overline{Y}C+XY\overline{C} \qquad (10)$$

which reduces to $$\overline{C}_o(\overline{\text{borrow}})=X\overline{Y}+(XY+\overline{X}\overline{Y})\overline{C} \qquad (11)$$

Returning to the drawing, to operate the circuit as an adder, the control voltages $K_1$–$K_4$ are made to represent the following binary digits:

$$K_1=0$$
$$K_2=1$$
$$K_3=1$$
$$K_4=0$$

This means that "none" gates 16 and 18 are inactivated and "none" gates 14 and 20 are enabled. The input to terminal 38 is the carry from the previous stage, in the event that there is a previous stage. As is shown in the drawing, the input is actually $\overline{C}$. If, however, the $A^n$ stage corresponds to the bit of lowest significance, and there is no previous carry, then $C=0$ *and* $\overline{C}=1$ for addition and $C=1$, $\overline{C}=0$ for subtraction.

In Boolean terms, the output available at lead 22 is $$Z=XY+\overline{X}\overline{Y} \qquad (12)$$

Z is inverted by stage 24 to obtain $$\overline{Z}=X\overline{Y}+\overline{X}Y \qquad (13)$$

The $S^n$(sum) output available at terminal 44 is $$S^n(\text{sum})=Z\overline{C}+\overline{C}\overline{Z} \qquad (14)$$

Substituting Equations 12 and 13 into Equation 14 gives $$S^n(\text{sum})=(XY+\overline{X}\overline{Y})C+(X\overline{Y}+\overline{X}Y)\overline{C} \qquad (15)$$

Equation 15 is identical with Equation 2 proving that the sum output at terminal 44 is correct.

The $C_o{}^n$(carry) output at terminal 46 is $$C_o{}^n(\text{carry})=XZ+\overline{Z}\overline{C} \qquad (16)$$

Substituting Equations 12 and 13 into Equation 16 gives $$C_o{}^n(\text{carry})=X(XY+\overline{X}\overline{Y})C+(X\overline{Y}+\overline{X}Y) \qquad (17)$$

which may be reduced to $$C_o{}^n(\text{carry})=XY+C(X\overline{Y}+\overline{X}Y) \qquad (18)$$

Equation 18 is identical to Equation 4 proving that the $A^n$ stage properly performs the carry function.

The $A^{n+1}$ stage is like the $A^n$ stage with the following exceptions: X rather than $\overline{X}$ is applied as one of the inputs to "none" gate 34*a*. The carry input from terminal 46 to inverter 42*a* is a C rather than a $\overline{C}$. The output of inverter 42*a* is applied to "none" gate 36*a* rather than "none" gate 30. Finally, the output at terminal 46*a* is $\overline{\text{carry}}$ rather than carry.

The Z and $\overline{Z}$ quantities of the $A^{n+1}$ stage are identical with the same quantities of the $A^n$ stage since the same control voltages are applied to the flexible logic gates in both stages. The sum output available at terminal 44 is $$S^{n+1}(\text{sum})=\overline{Z}\overline{C}+ZC \qquad (19)$$

This, of course, is identical with Equation 14 proving that the sum output of the $A^{n+1}$ stage is correct. The $\overline{C}$ output at terminal 46*a* is $$\overline{C}_o{}^{n+1}(\overline{\text{carry}})=\overline{Z}\overline{C}+\overline{X}Z \qquad (20)$$

Substituting Equations 12 and 13 into 20 gives $$\overline{C}_o{}^{n+1}(\overline{\text{carry}})=(X\overline{Y}+\overline{X}Y)\overline{C}+\overline{X}(XY+\overline{X}\overline{Y}) \qquad (21)$$

which can be reduced to $$\overline{C}_o{}^{n+1}(\overline{\text{carry}})=\overline{X}\overline{Y}+(X\overline{Y}+\overline{X}Y)\overline{C} \qquad (22)$$

Equation 22 is identical with Equation 6 proving that the output at terminal 46*a* is $\overline{\text{carry}}$.

As mentioned in the introductory portion of the specification, the flexible logic networks in the $A^n$ and $A^{n+1}$ stages can be used for performing any one of 16 different logic functions. If it is desired not to do arithmetic or subtraction but instead to have the flexible logic networks perform other functions for the computer, $I=1$ is applied to "none" gates 30, 36, 30*a* and 36*a*. This inactivates these gates. The flexible logic network output is then available at terminals 48 and 48*a*.

An important feature of the adder described above is that the carry propagation time is kept at a small value. In each case, the output is made to be such that the inverter need not be placed in series with a line carrying a carry from one carry output terminal to a "none" gate leading to the next carry output terminal. For example, it may be noted that the carry goes directly from terminal 46 through lead 50 to the "none" gate 28*a* in the path of carry output terminal 46*a*. Note that if $\overline{C}(\overline{\text{carry}})$ rather than C(carry) were available at terminal 46 or if C(carry) rather than $\overline{C}(\overline{carry})$ were available at terminal 38, the inverters would have to be placed in series with the lines extending from carry terminal to carry terminal and the delay in obtaining the last carry would then include the sum of the delays introduced by the inverters. The advantage of minimum C(borrow) propagation time is also present when using the circuit for subtraction.

The circuit of the invention performs subtraction when the following control binary digits are applied to the flexible logic networks:

$$K_1=1$$
$$K_2=0$$
$$K_3=0$$
$$K_4=1$$

These inputs inactivate "none" gates 14 and 20 and enable "none" gates 16 and 18. Also, the input applied to terminal 38 is C rather than $\overline{C}$. It is to be understood that when the circuit is employed as a subtracter, C represents borrow rather than carry and S represents difference rather than sum.

In Boolean terms, the output $Z_d$ of the flexible logic network available at lead 22 and the inverted output available at lead 32 are:

$$Z_d=X\bar{Y}+\bar{X}Y \quad (23)$$
$$\bar{Z}_d=XY+\bar{X}\bar{Y} \quad (24)$$

The $S^n$(difference) available at lead 44 is $$S^n(\text{difference})=Z_d\bar{C}+\bar{Z}_dC \quad (25)$$

Note, in this connection, that when operating as a subtracter, the input from terminal 38 to "none" gates 28 and 38 is C(borrow) and the input to "none" gate 30 is $\overline{C}$(borrow). In other words, the C inputs to the "none" gates 28, 36 and 30, when the circuit is operating as a subtracter, are the complements of the C inputs to the "none" gates when the circuit is acting as an adder. Substituting Equations 23 and 24 into 25 gives $$S^n(\text{difference})=(X\bar{Y}+\bar{X}Y)\bar{C}+(XY+\bar{X}\bar{Y})C \quad (26)$$

This equation checks with Equations 7 and 2 proving that the $A^n$ stage properly performs the difference function. The $\overline{C}_o{}^n$(borrow) output at terminal 46 is $$\bar{C}_o(\overline{\text{borrow}})=\bar{Z}_d\bar{C}+XZ_d \quad (27)$$

Substituting Equations 23 and 24 into Equation 27 gives $$\bar{C}_o{}^n(\overline{\text{borrow}})=(XY+\bar{X}\bar{Y})\bar{C}+X(X\bar{Y}+\bar{X}Y) \quad (28)$$

which can be simplified to $$\bar{C}_o{}^n(\overline{\text{borrow}})=(XY+\bar{X}\bar{Y})\bar{C}+X\bar{Y} \quad (29)$$

This equation is identical to Equation 11 proving that the $A^n$ stage properly performs the $\overline{\text{borrow}}$ function.

In like manner, the difference and borrow quantities available at terminals **44*a* and 46*a*** of the $A^{n+1}$ stage are, by inspection, $$S^{n+1}(\text{difference})=\bar{Z}_dC+Z_d\bar{C} \quad (30)$$
$$C_o{}^{n+1}(\text{borrow})=\bar{Z}_dC+\bar{X}Z_d \quad (31)$$
$$C_o{}^{n+1}(\overline{\text{borrow}})=(XY+\bar{X}\bar{Y})C+\bar{X}Y \quad (32)$$

Equation 30 is identical to Equation 25 proving that the $A^{n+1}$ stage properly performs the difference function. Equation 32 is identical with Equation 9 proving that the $A^{n+1}$ stage properly performs the borrow function.

What is claimed is:

1. A binary adder-subtracter comprising, a flexible logic network made up of four logic gates for deriving from the respective input signals indicative of binary digits XY, $X\bar{Y}$, $\bar{X}Y$ and $\bar{X}\bar{Y}$, a signal indicative of the binary digit Z in response to certain control voltages applied to said network and a signal indicative of the binary digit $\bar{Z}$ in response to other control voltages applied to the network, where Z is defined by the Boolean equation $Z=XY+\bar{X}\bar{Y}$; and a network receptive of the Z signal and a carry signal $\bar{C}$ for deriving therefrom sum S and carry $C_o$ output signals defined by the Boolean equations $S=ZC+\bar{Z}\bar{C}$ and $C_o=XZ+C\bar{Z}$, and receptive of the $\bar{Z}$ signal and a borrow signal C for deriving therefrom difference S and borrow $\bar{C}_o$ output signals defined by the Boolean equations $S=\bar{Z}\bar{C}+ZC$ and $\bar{C}_o=Z\bar{C}+X\bar{Z}$.

2. A binary adder-subtracter comprising, a flexible logic network made up of four "none" gates for deriving from input signals indicative of binary digits X, $\bar{X}$, Y and $\bar{Y}$ a signal indicative of the binary digit Z in response to certain control voltages applied to said network and a signal indicative of the binary digit $\bar{Z}$ in response to other control voltages applied to the network, where Z is defined by the Boolean equation $Z=XY+\bar{X}\bar{Y}$; and a network receptive of the Z signal and a carry signal $\bar{C}$ for deriving therefrom sum S and carry $C_o$ output signals defined by the Boolean equations $$S=ZC+\bar{Z}\bar{C} \text{ and } C_o=XZ+C\bar{Z}$$

and receptive of the $\bar{Z}$ signal and a borrow signal C for deriving therefrom difference S and borrow $\bar{C}_o$ output signals defined by the Boolean equations $S=\bar{Z}\bar{C}+ZC$ and $\bar{C}_o=Z\bar{C}+X\bar{Z}$.

3. In a binary arithmetic circuit, four "none" gates; means for applying to the first "none" gate signals indicative of the quantities $\bar{X}$ and $\bar{Z}$; means for applying to the second "none" gate signals indicative of the quantities Z and $\bar{C}$; means for applying to the third "none" gate signals indicative of the quantities $\bar{Z}$ and $\bar{C}$; means for applying to the fourth "none" gate signals indicative of the quantities Z and C, where $Z=XY+\bar{X}\bar{Y}$, X is an addend binary digit, Y is an augend binary digit, and C is a carry binary digit; an "or" circuit connected to receive the outputs of the first and second gates; and an "or" circuit connected to receive the outputs of the third and fourth gates.

4. In a binary arithmetic circuit as set forth in claim 3, said means for applying signals to the first, second, third, and fourth "none" gates each including a flexible logic network.

5. In a binary arithmetic circuit, four "none" gates; means for applying to the first "none" gate signals indicative of the quantities $\bar{X}$ and $\bar{Z}$; means for applying to the second "none" gate signals indicative of the quantities Z and C; means for applying to the third "none" gate signals indicative of the quantities $\bar{Z}$ and C; means for applying to the fourth "none" gate signals indicative of the quantities Z and $\bar{C}$, where $Z=X\bar{Y}+\bar{X}Y$, X is a minuend binary digit, Y is a subtrahend binary digit, and C is a borrow binary digit; an "or" circuit connected to receive the outputs of the first two gates; and an "or" circuit connected to receive the outputs of the second two gates.

6. In a binary arithmetic circuit as set forth in claim 5, each means for applying signals to a "none" gate including a flexible logic network.

7. In a parallel binary adder-subtracter circuit, a plurality of stages, each for adding or subtracting digits of different rank; and means for applying via one signal lead carry signals from odd to even ones of said stages and via one signal lead $\overline{\text{carry}}$ signals from even to odd ones of said stages when the circuit is adding and via the same lead as used for the carry signals $\overline{\text{borrow}}$ signals from odd to even ones of said stages and via the same lead as used for the $\overline{\text{carry}}$ signals borrow signals from even to odd ones of said stages when the circuit is subtracting.

8. In a parallel binary adder-subtracter, a plurality of stages, each for operating on a binary bit of different rank, each stage comprising a flexible logic network for deriving from input signals indicative of the binary digits X, $\overline{X}$, Y and $\overline{Y}$ a signal indicative of the binary digit Z in response to certain control voltages applied to said network and a signal indicative of the binary digit $\overline{Z}$ in response to other control voltages applied to the network, where Z is defined by the Boolean equation $Z=XY+\overline{XY}$; a plurality of networks, one in each alternate stage, each network receptive of the Z signal, a carry signal $\overline{C}$ and one of said input signals for deriving therefrom sum S and carry $C_o$ output signals defined by the Boolean equations $S=ZC+\overline{ZC}$ and $C_o=ZC+C\overline{Z}$, and receptive of the $\overline{Z}$ signal, a borrow signal C, and one of said input signals for deriving therefrom difference S and borrow $\overline{C}_o$ output signals defined by the Boolean equations $S=\overline{ZC}+ZC$ and $\overline{C}_o=Z\overline{C}+X\overline{Z}$; and a plurality of networks, one in each remaining stage, each said network receptive of the Z signal, a carry signal C, and one of said input signals for deriving therefrom the sum S and carry $\overline{C}_o$ output signals defined by the Boolean equations $S=\overline{ZC}+ZC$ and $\overline{C}_o=\overline{CZ}+\overline{X}Z$, and receptive of the $\overline{Z}$ signal, borrow signal $\overline{C}$, and one of said input signals for deriving therefrom the difference S and borrow $C_o$ output signals defined by the Boolean equations $S=CZ+\overline{CZ}$ and $C_o=CZ+\overline{XZ}$.

9. In a parallel binary adder-subtracter, a plurality of stages, each for operating on a binary bit of different rank, each stage comprising a flexible logic network for deriving from input signals indicative of binary digits X, $\overline{X}$, Y and $\overline{Y}$, a signal indicative of the binary digit Z in response to certain control voltages applied to said network and a signal indicative of the binary digit $\overline{Z}$ in response to other control voltages applied to the network, where Z is defined by the Boolean equation $Z=XY+\overline{XY}$;

a network in each odd stage receptive of the Z signal, a carry signal $\overline{C}$ and one of said input signals for deriving therefrom sum S and carry $C_o$ output signals defined by the Boolean equations $S=ZC+\overline{ZC}$ and $C_o=XZ+C\overline{Z}$, and receptive of the $\overline{Z}$ signal, a borrow signal C, and one of said input signals for deriving therefrom difference S and borrow $\overline{C}_o$ output signals defined by the Boolean equations $S=\overline{ZC}+ZC$ and $\overline{C}_o=Z\overline{C}+X\overline{Z}$; a network in each even stage receptive of the Z signal, a carry signal C, and one of said input signals for deriving therefrom sum S and carry $\overline{C}_o$ output signals defined by the Boolean equations $S=ZC+\overline{ZC}$ and $\overline{C}_o=\overline{CZ}+\overline{X}Z$, and receptive of the $\overline{Z}$ signal, a borrow signal $\overline{C}$ and one of said input signals for deriving therefrom difference S and borrow $C_o$ output signals defined by the Boolean equations $S=\overline{ZC}+ZC$ and $C_o$ and $C_o=CZ+\overline{XZ}$; and means for applying the carry output signal $C_o$ from even to odd stages and $\overline{C}_o$ from odd to even stages when the circuit is adding and the borrow output signal $C_o$ from odd to even stages and $\overline{C}_o$ from even to odd stages when the circuit is subtracting.

References Cited in the file of this patent

UNITED STATES PATENTS

| | | |
|---|---|---|
| 2,803,401 | Nelson | Aug. 20, 1957 |
| 2,872,111 | Hecht | Feb. 3, 1959 |
| 2,952,407 | Weiss et al. | Sept. 13, 1960 |
| 3,001,711 | Frohman | Sept. 26, 1961 |

OTHER REFERENCES

De Sautels: The Versatile Transistor NOR Circuit, Control Engineering, May 1960, pp. 101–104.

UNITED STATES PATENT OFFICE
CERTIFICATE OF CORRECTION

Patent No. 3,100,837 August 13, 1963

William J. Gesák, Jr.

It is hereby certified that error appears in the above numbered patent requiring correction and that the said Letters Patent should read as corrected below.

Column 1, lines 47 and 51, for "$XY+\overline{XY}$", each occurrence, read -- $XY+\bar{X}\bar{Y}$ --; line 54, for "$(\overline{XY}+XY)$" read -- $(\bar{X}\bar{Y}+XY)$ --; same column 1, line 61, for "$(XY+\overline{XY})$" read -- $(XY+\bar{X}\bar{Y})$ --; column 2, line 20, for "$\overline{AB}$" read -- $\bar{A}\bar{B}$ --; line 57, for "$\overline{XY}$" read -- $\bar{X}\bar{Y}$ --; column 3, equations (1), (2), (5), (6), (8), (9), (10), and (11) should appear as shown below instead of as in the patent:

$$S(sum)=\bar{X}\bar{Y}C+\bar{X}Y\bar{C}+X\bar{Y}\bar{C}+XYC \quad (1)$$

$$S(sum)=(\bar{X}\bar{Y}+XY)C+(\bar{X}Y+X\bar{Y})\bar{C} \quad (2)$$

$$\bar{C}_o(\overline{carry})=\bar{X}\bar{Y}\bar{C}+\bar{X}\bar{Y}C+\bar{X}Y\bar{C}+X\bar{Y}\bar{C} \quad (5)$$

$$\bar{C}_o(\overline{carry})=\bar{X}\bar{Y}+(\bar{X}Y+X\bar{Y})\bar{C} \quad (6)$$

$$C_o(borrow)=\bar{X}\bar{Y}C+\bar{X}Y\bar{C}+\bar{X}YC+XYC \quad (8)$$

$$C_o(borrow)=\bar{X}Y+C(XY+\bar{X}\bar{Y}) \quad (9)$$

$$\bar{C}_o(\overline{borrow})=\bar{X}\bar{Y}\bar{C}+X\bar{Y}\bar{C}+X\bar{Y}C+XY\bar{C} \quad (10)$$

$$\bar{C}_o(\overline{borrow})=X\bar{Y}+(XY+\bar{X}\bar{Y})\bar{C} \quad (11)$$

column 4, equations (12), (14), (15), (16), (17), (19), (20), (21), and (22) should appear as shown below instead of as in the patent:

$$Z=XY+\bar{X}\bar{Y} \quad (12)$$

$$S^n(sum)=ZC+\bar{C}\bar{Z} \quad (14)$$

$$S^n(sum)=(XY+\bar{X}\bar{Y})C+(X\bar{Y}+\bar{X}Y)\bar{C} \quad (15)$$

$$C_o{}^n(carry)=XZ+\bar{Z}C \quad (16)$$

$$C_o{}^n(carry)=X(XY+\bar{X}\bar{Y})+C(X\bar{Y}+\bar{X}Y) \quad (17)$$

$$S^{n+1}(\text{sum})=\bar{Z}\bar{C}+ZC \qquad (19)$$

$$\bar{C}_o{}^{n+1}(\overline{\text{carry}})=\bar{Z}\bar{C}+\bar{X}Z \qquad (20)$$

$$\bar{C}_o{}^{n+1}(\overline{\text{carry}})=(X\bar{Y}+\bar{X}Y)\bar{C}+\bar{X}(XY+\bar{X}\bar{Y}) \qquad (21)$$

$$\bar{C}_o{}^{n+1}(\overline{\text{carry}})=\bar{X}\bar{Y}+(X\bar{Y}+\bar{X}Y)\bar{C} \qquad (22)$$

column 5, equations (24), (26), (28), (29), and (32) should appear as shown below instead of as in the patent:

$$\bar{Z}_d=XY+\bar{X}\bar{Y} \qquad (24)$$

$$S^n(\text{difference})=(X\bar{Y}+\bar{X}Y)\bar{C}+(XY+\bar{X}\bar{Y})C \qquad (26)$$

$$\bar{C}_o{}^n(\overline{\text{borrow}})=(XY+\bar{X}\bar{Y})\bar{C}+X(X\bar{Y}+\bar{X}Y) \qquad (28)$$

$$\bar{C}_o{}^n(\overline{\text{borrow}})=(XY+\bar{X}\bar{Y})\bar{C}+X\bar{Y} \qquad (29)$$

$$C_o{}^{n+1}(\text{borrow})=(XY+\bar{X}\bar{Y})C+\bar{X}Y \qquad (32)$$

same column 5, line 34, for "38" read -- 36 --; line 72, for "$\overline{XY}$" read -- $\bar{X}\bar{Y}$ --; column 6, line 2, for "$Z=XY+\overline{XY}$" read -- $Z=XY+\bar{X}\bar{Y}$ --; line 5, for "$S=ZC+\overline{ZC}$" read -- $S=ZC+\bar{Z}\bar{C}$ --; line 8, for "$S=\overline{ZC}+ZC$" read -- $S=\bar{Z}\bar{C}+ZC$ --; line 16, for "$Z=XY+\overline{XY}$" read -- $Z=XY+\bar{X}\bar{Y}$ --; line 22, for "$S=ZC+\overline{ZC}$" read -- $S=ZC+\bar{Z}\bar{C}$ --; line 25, for "$S=\overline{ZC}+ZC$" read -- $S=\bar{Z}\bar{C}+ZC$ --; line 26, for "$\bar{C}_o=Z\bar{C}+\overline{XZ}$" read -- $\bar{C}_o=Z\bar{C}+\bar{X}\bar{Z}$ --; same column 6, line 35, for "$Z=XY+\overline{XY}$" read -- $Z=XY+\bar{X}\bar{Y}$ --; column 7, line 6, for "$Z=XY+\overline{XY}$" read -- $Z=XY+\bar{X}\bar{Y}$ --; line 11, for "$S=ZC+\overline{ZC}$ and $C_o=ZC+C\bar{Z}$" read -- $S=ZC+\bar{Z}\bar{C}$ and $C_o=XZ+C\bar{Z}$ --; line 16, for "$S=\overline{ZC}+ZC$" read -- $S=\bar{Z}\bar{C}+ZC$ --; line 21, for "$S=\overline{ZC}+ZC$ and $\bar{C}_o=\overline{CZ}+\bar{X}Z$" read -- $S=\bar{Z}\bar{C}+ZC$ and $\bar{C}_o=\bar{C}\bar{Z}+\bar{X}Z$ --; lines 24 and 25, for "$S=CZ+\overline{CZ}$ and $C_o=CZ+\overline{XZ}$" read -- $S=CZ+\bar{C}\bar{Z}$ and $C_o=CZ+\bar{X}\bar{Z}$ --; same column 7, line 35, for "$Z=XY+\overline{XY}$" read -- $Z=XY+\bar{X}\bar{Y}$ --; column 8, line 4, for "$S=ZC+\overline{ZC}$" read -- $S=ZC+\bar{Z}\bar{C}$ --; line 8, for "$S=\overline{ZC}+ZC$" read -- $S=\bar{Z}\bar{C}+ZC$ --; line 13, for "$S=ZC+\overline{ZC}$ and $\bar{C}_o=\overline{CZ}+\bar{X}Z$" read -- $S=ZC+\bar{Z}\bar{C}$ and $\bar{C}_o=\bar{C}\bar{Z}+\bar{X}Z$ --; same column 8, line 17, for "$S=\overline{ZC}+ZC$ and $C_o$ and $C_o=CZ+\overline{XZ}$" read -- $S=\bar{Z}\bar{C}+ZC$ and $C_o$ and $C_o=CZ+\bar{X}\bar{Z}$ --.

Signed and sealed this 12th day of May 1964.

(SEAL)
Attest:

ERNEST W. SWIDER
Attesting Officer

EDWARD J. BRENNER
Commissioner of Patents